United States Patent [19]

Verhoeven et al.

[11] Patent Number: 4,623,496
[45] Date of Patent: Nov. 18, 1986

[54] METHOD OF MANUFACTURING AN OPTICAL ELEMENT HAVING AN ASPHERIC SURFACE

[75] Inventors: Johannes M. G. Verhoeven; Albert Smid; Herman M. A. Amendt, all of Eindhoven, Netherlands

[73] Assignee: U.S. Philips Corporation, New York, N.Y.

[21] Appl. No.: 683,094

[22] Filed: Dec. 18, 1984

[30] Foreign Application Priority Data

Jan. 18, 1984 [NL] Netherlands ..................... 8400152

[51] Int. Cl.⁴ ............................................. B29D 11/00
[52] U.S. Cl. ..................................... 264/1.7; 425/808
[58] Field of Search .................. 264/1.7, 1.8, 24, 1.1; 425/808

[56] References Cited

U.S. PATENT DOCUMENTS

| | | | |
|---|---|---|---|
| 2,253,697 | 8/1941 | Genesy | 264/2.4 |
| 2,298,429 | 10/1942 | Smith | 264/2.4 |
| 2,332,674 | 10/1943 | Smith | 264/2.4 |
| 2,332,930 | 10/1943 | Rinia | 264/1.7 |
| 2,890,486 | 6/1959 | Crandon | 425/808 |
| 4,319,945 | 3/1982 | Howdin | 264/1.7 |
| 4,432,832 | 2/1984 | Fantone | 264/1.7 |

FOREIGN PATENT DOCUMENTS 1301551 12/1972 United Kingdom .
1535986 12/1978 United Kingdom .

Primary Examiner—James Lowe
Attorney, Agent, or Firm—Marc D. Schechter

[57] ABSTRACT

For manufacturing monaspherical lenses, a correction layer of a synthetic resin is provided on a substrate having a spherical surface. In this method, centering is performed by using the curvature of the surface of the matrix. With a correct choice of the radius of curvature of the substrate surface, the substrate approaches the matrix most closely near a collection of inflection points in the matrix surface situated on a circle. A good centering without a guiding mechanism is possible by using the method according to the invention. Moreover, the differences in thickness in the correction layer are small enough to prevent shrinkage defects upon curing of the synthetic resin layer.

1 Claim, 5 Drawing Figures

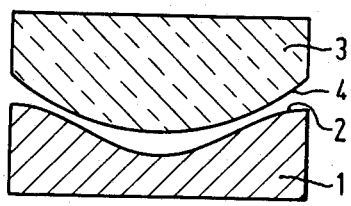 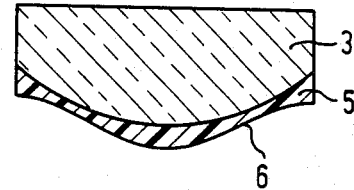
FIG.1  FIG.2
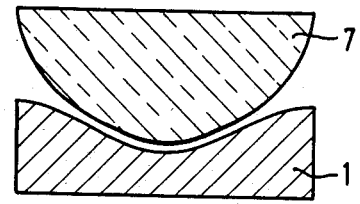 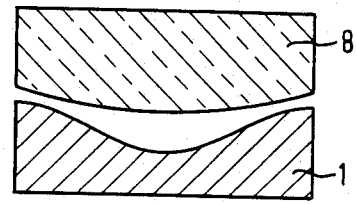
FIG.3  FIG.4
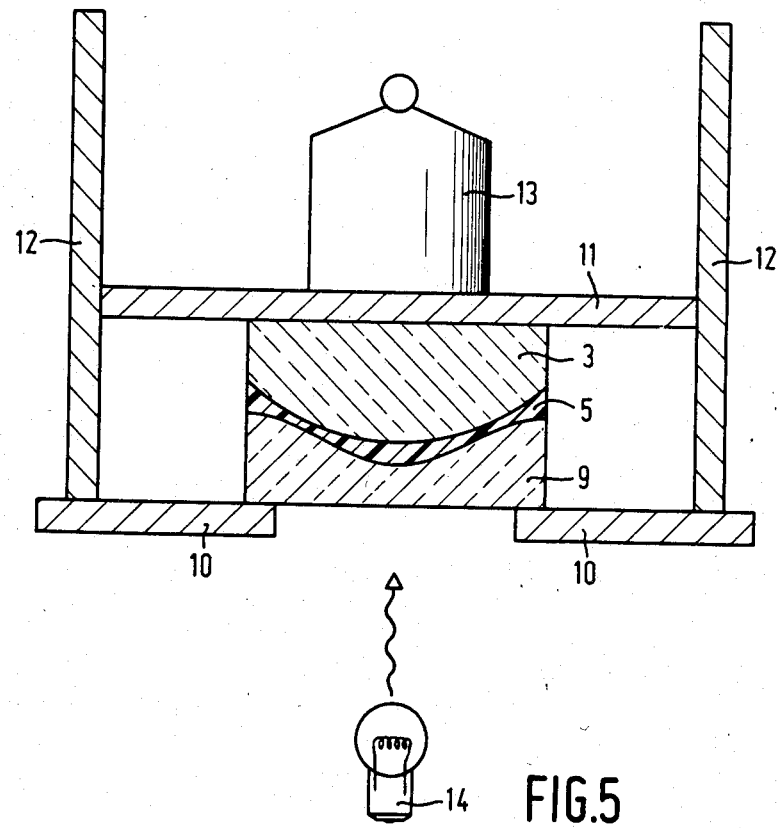
FIG.5

METHOD OF MANUFACTURING AN OPTICAL ELEMENT HAVING AN ASPHERIC SURFACE

BACKGROUND OF THE INVENTION

The invention relates to a method of manufacturing an aspherical optical element. The aspherical optical element includes a substrate having an approximately spherical surface and a synthetic resin correction layer provided on the spherical surface. The free surface of the correction layer is convex aspherical and has a collection of inflection points situated approximately on a circle.

According to the method, the substrate is placed opposite to and spaced from a rotationally symmetrical matrix which has a concave aspherical surface having a collection of inflection points situated approximately on a circle. A curable liquid synthetic resin composition is provided between the matrix and the substrate, and the distance between the matrix and the substrate is reduced to a desired final position. The synthetic resin composition is the cured, and the substrate together with the correction layer, the connected thereto, are removed from the matrix.

The invention also relates to a device for performing the method, and the aspherical optical element made by the method.

The method may be used, for example, for manufacturing monaspherical.

British Pat. No. 1,301,551 discloses a method of manufacturing an aspherical optical element by providing a thermosetting layer of synthetic resin on a flat or spherical substrate, for example for correction of aberration. The variation in thickness of the layer of synthetic resin must be in agreement with the desired correction. A positive curvature may be necessary in the center of the optical element and a negative curvature may be necessary at the edge. In between, a collection of inflection points exists on the surface of the correction layer.

If the layer of synthetic resin is too thick, inaccuracies arise due to shrinkage of the resin during curing. The correction layer may be made thinner by providing the substrate with approximately the desired surface, but a spherical substrate can be manufactured more simply and more accurately than a substrate having an aspherical surface.

When a spherical substrate is used it is necessary to center the substrate accurately with respect to the matrix prior to curing the synthetic resin. For that purpose, a guiding mechanism may be provided to keep the matrix and the substrate in their desired positions.

A thermosetting resin is used in the method described in British Pat. No. 1,301,551. Alternatively the synthetic resin may be light-curable, as described, for example, in German Patent Application No. 2,637,257 (corresponding to British Pat. No. 1,535,986).

SUMMARY OF THE INVENTION

It is an object of the present invention to provide a method of manufacturing an aspherical optical element from a substrate having a spherical surface, in which the substrate and matrix can be positioned without a guiding mechanism and in which shrinkage of the correction layer does not give rise to inaccuracies.

According to the invention, this object is achieved by a method in which the spherical surface of the substrate has a radius of curvature closen such that the synthetic resin layer has a minimum thickness adjacent to the collection of inflection points.

The invention is base on the discovery of the fact that the radius of curvature of the spherical surface of the substrate can be chosen freely within certain limits. The correction layer also functions to correct the focal distance.

When the radius of curvature of the substrate is chosen according to the invention, the substrate and the matrix approach each other most closely near a collection of points which are situated on a circle. This diameter of the circle is not too small, so that accurate positioning is possible. Such accurate positioning is not possible when the radius of curvature of the spherical surface of the substrate is so small that the substrate and the matrix approach each other most closely near a single point approximately in the center of the matrix and the substrate. Moreover, in that case the thickness of the correction layer at the outer edge becomes undesirably large. As a result, shrinkage problems arise during curing.

If, on the other hand, the radius of curvature of the spherical surface of the substrate is so large that the substrate and the matrix approach each other most closely near the outer edge of the substrate, then accurate positioning is possible. However, in that case the thickness of the correstion layer is too large in the center. This again gives rise to shrinkage problems.

If the points of nearest approach of the substrate and the matrix are situated in the center or at the edge of the correction layer, then the differences in thickness in the correction layer are approximately twice as large as when these points are situated adjacent to the collection of inflection points.

BRIEF DESCRIPTION OF THE DRAWING

FIG. 1 is a cross-sectional view of a substrate and a matrix according to the invention;

FIG. 2 is a cross-sectional view of a substrate with a correction layer according to the invention;

FIG. 3 is a cross-sectional view of a substrate and a matrix not according to the invention.

FIG. 4 is a cross-sectional view of a substrate and a matrix not according to th invention.

FIG. 5 is a cross-sectional view of a substrate and a device according to the invention.

DESCRIPTION OF THE PREFERRED EMBODIMENTS

FIG. 1 is a cross-sectional view of a matrix 1, for example made of glass or a metal. The inner surface 2 of matrix 1 matches the desired outer surface of the correction layer.

The substrate 3 may be manufacutred, for example, from glass or a transparent synthetic resin. Substrate 3 has an approximately spherical outer surface 4.

A quantity of a curable liquid synthetic resin composition is provided between the surfaces 2 and 4. Then the distance betwween the matrix 1 and the substrate 3 is reduced to a desired position. Finally, the curable synthetic resin composition is cured. The curable liquid synthetic resin composition may be provided between the matrix 1 and the substrate 3 after they have been placed opposite each other, but it is efficacious to first provide a drop of the curable synthetic resin composition on the substrate or on the matrix and then press the substrate and matrix together.

The choice of curable synthetic resin composition depends on the requirements which are imposed on the correction layer, for example as regards hardness, light transmission and refractive index. Suitable starting materials are monomeric or oligomeric acrylates, for example the diglycidyl ether of bisphenol A with which $\alpha,\alpha$-dimethoxy-$\alpha$-phenyl acetophenone may be used as an initiator. This synthetic resin may be made to cure under UV light, for example by exposure to the light of a medium-pressure mercury lamp having a wavelength of 360 nm for 1 minute.

FIG. 2 is a cross-sectional view of the substrate 3 bearing a correction layer 5. The free surface 6 of correction layer 5 has desired aspherical shape. The diameter of the substrate 3 may be, for example, 5 mm. If in that case a weight of 30 g is used to compress the substrate 3 and the matrix 1 during curing of the synthetic resin layer 5, the smallest thickness of the correction layer 5 after curing will be approximately 1 $\mu$m (adjacent to the substantially circular collection of inflection points) as a result of capillary forces. In that case the largest thickness in the center is 7–15 $\mu$m and the largest thickness at the outer edge is approximately 15 $\mu$m.

The desired radius of curvature of the spherical surface 4 of the substrate 2 according to the invention can be simply determined geometrically from a drawing or by a few experiments in which an accuracy of a few microns is necessary. Control of the place where the synthetic resin layer has the smallest thickness is possible, for example, by measuring interference rings.

COMPARATIVE EXAMPLES (not according to the invention)

FIG. 3 is a cross-sectional view of a matrix 1 and a substrate 7. Substrate 7 has a surface having such a small radius of curvatue that the matrix 1 and the substrate 7 approach each other most closely near the center of the matrix 1 and the substrate 7. The thickness of the correction layer at the outer edge is approximately twich as large as in the example according to the invention. Moreover, the matrix 1 and the substrate 7 are not accurately positioned relative to each other because lateral displacement of the substrate 7 with respect to the matrix 1 is possible unless the two are pressed together very strongly.

FIG. 4 is a cross-sectional view of a matrix 1 and a substrate 8. In this case, substrate 8 has a surface having such a large radius of curvature that the matrix 1 and the substrate 8 approach each other most closely near the outer edge of the substrate 8. The thickness of the correction layer 5 in the center is approximately twich as large as in the example according to the invention. As a result, the synthetic resin layer 5 shrinks considerably in the center on curing to form surface irregularities.

EXAMPLE OF A DEVICE ACCORDING TO THE INVENTION

FIG. 5 is a cross-sectional view (not drawn to scale) of a substrate and a device according to the invention. The device includes a light transmitting matrix 9 bearing on an annular support 10. A substrate 3 having surface with a radius of curvature according to the invention is present above the matrix 9. Both the substrate 3 and the matrix 9 have flat rear surfaces. A quantity of a curable liquid synthetic resin composition is provided between the matrix 9 and the substrate 3. The substrate 3 is pressed toward matrix 9 by a plate 11. Plate 11 is parallel to the support 10 and can be moved between guides 12 with respect to the support 10. The plate 11 is pressed against the substrate 3 with an accurately determined force, for example, by a weight 13. Plate 11 therefore orients the substrate parallel to matrix 9 as the substrate and matrix are pressed together. The curable liquid synthetic resin composition 5 may be cured by exposure to the light of an urltrviolet lame 14. The light from lamp 14 reaches the resin 5 by passing through the matrix 9.

When using the method according to the invention it is also possible to use a matrix which is not light transmitting. In that case, light may be guided to the synthetic resin composition through the substrate. Alternatively, it is possible to use a heat curable synthetic resin composition.

What is claimed is:

1. A method of manufacturing an optical element, said optical element comprising a layer of synthetic resin on an approximately spherical surface of a substrate, said method comprising the steps of:

providing a matrix, said matrix having a rotationally symmetrical concave aspherical surface having a collection of inflection points situated approximately on a circle;

providing a curable liquid synthetic resin on the aspherical surface of the matrix;

providing a substrate having an approximately spherical convex surface with a radius of curvature;

arranging the substrate so that its spherical surface is opposite the aspherical surface of the matrix;

pressing the substrate and matrix toward each other until they are spaced apart a desired distance; and the curing the synthetic resin to form a layer having an aspherical convex outer surface with a collection of inflection points situated approximately on a circle, said layer having a varying thickness;

characterized in that the radius of curvature of the spherical surface of the substrate is chosen so that the minimum thickness of the resin layer is located adjacent to the collection of inflection points.

* * * * *

UNITED STATES PATENT AND TRADEMARK OFFICE
CERTIFICATE OF CORRECTION

PATENT NO. : 4,623,496

DATED : Nov. 18, 1986

INVENTOR(S) : JOHANNES M.G. VERHOEVEN ET AL

It is certified that error appears in the above-identified patent and that said Letters Patent is hereby corrected as shown below:

IN THE CLAIMS:

Claim 1, line 17, (Col.4, line 47) change "the" to --then--

Signed and Sealed this

First Day of September, 1987

Attest:

DONALD J. QUIGG

Attesting Officer

Commissioner of Patents and Trademarks